(12) United States Patent
Raimbeault

(10) Patent No.: US 7,974,889 B2
(45) Date of Patent: Jul. 5, 2011

(54) SOCIAL NETWORKING INTERACTIVE SHOPPING SYSTEM

(76) Inventor: Sean M. Raimbeault, West Warwick, RI (US)

( * ) Notice: Subject to any disclaimer, the term of this patent is extended or adjusted under 35 U.S.C. 154(b) by 698 days.

(21) Appl. No.: 11/976,035

(22) Filed: Oct. 19, 2007

(65) Prior Publication Data
US 2009/0106085 A1    Apr. 23, 2009

(51) Int. Cl.
*G06Q 30/00* (2006.01)
(52) U.S. Cl. ...................... 705/26.7; 705/27.1
(58) Field of Classification Search .................... 705/26, 705/27
See application file for complete search history.

(56) References Cited

U.S. PATENT DOCUMENTS

| | | | |
|---|---|---|---|
| 5,424,524 A | 6/1995 | Ruppert et al. | |
| 6,014,638 A * | 1/2000 | Burge et al. | 705/27 |
| 6,233,564 B1 | 5/2001 | Schulze, Jr. | |
| 6,435,407 B1 | 8/2002 | Fiordelisi | |
| 6,484,939 B1 | 11/2002 | Blaeuer | |
| 6,507,279 B2 | 1/2003 | Loof | |
| 6,533,173 B2 | 3/2003 | Benyak | |
| 6,659,346 B1 | 12/2003 | Williams | |
| 6,725,206 B1 | 4/2004 | Coveley | |
| 6,997,382 B1 | 2/2006 | Bhri | |
| 7,036,725 B2 | 5/2006 | Blaeuer | |
| 7,063,263 B2 | 6/2006 | Swartz et al. | |
| 7,195,157 B2 | 3/2007 | Swartz et al. | |
| 2002/0084323 A1 | 7/2002 | Benyak | |
| 2002/0128916 A1 | 9/2002 | Beinecke, III | |
| 2002/0178091 A1 * | 11/2002 | O'Hagan et al. | 705/27 |
| 2002/0194075 A1 | 12/2002 | O'Hagan et al. | |
| 2003/0015585 A1 | 1/2003 | Wike, Jr. et al. | |
| 2003/0132298 A1 | 7/2003 | Swartz et al. | |
| 2004/0073489 A1 | 4/2004 | Varatharajah et al. | |
| 2004/0181466 A1 * | 9/2004 | Ishida et al. | 705/27 |
| 2004/0249717 A1 * | 12/2004 | Shirasaki | 705/17 |
| 2004/0262385 A1 | 12/2004 | Blaeuer | |
| 2005/0086103 A1 | 4/2005 | Agura et al. | |
| 2005/0096997 A1 | 5/2005 | Jain et al. | |
| 2005/0177463 A1 | 8/2005 | Crutchfield, Jr. et al. | |
| 2006/0143067 A1 * | 6/2006 | Calabria | 705/10 |

(Continued)

FOREIGN PATENT DOCUMENTS
EP            0 623 904 A1    5/1994
(Continued)

OTHER PUBLICATIONS
Raban, Daphne R Internet Research v17n3 pp: 306-322 2007.*
(Continued)

*Primary Examiner* — Michael Misiaszek
*Assistant Examiner* — Resha Desai
(74) *Attorney, Agent, or Firm* — Richard C. Litman

(57) ABSTRACT

The social networking interactive shopping system includes a portable wireless user interface for use by a store customer when shopping. A merchant server is provided, the server having market survey, advertising, promotions, security, social networking services, web server capability, a quantitative prediction modeling system predicting behavior of the customer, a predictive response marketing/advertising system that targets advertising messages to the customer based on a predicted customer response to the advertising messages, and payment application software. The merchant server is capable of wired or wireless communication with the portable wireless user interface. A database is provided, and can be stored on site or off site. The database includes information associated with items for sale at the store, and is in operable communication with the merchant server. Using the portable wireless user interface, the store customer can purchase user selected store items thereby obviating necessity for travel through a store check-out line.

9 Claims, 8 Drawing Sheets

U.S. PATENT DOCUMENTS

| | | |
|---|---|---|
| 2006/0208072 A1 | 9/2006 | Ku et al. |
| 2006/0208073 A1 | 9/2006 | Blaeuer |
| 2006/0254861 A1* | 11/2006 | Perrier et al. .................. 186/26 |
| 2007/0094080 A1 | 4/2007 | Wiken |
| 2007/0179867 A1 | 8/2007 | Glazer et al. |
| 2007/0192183 A1 | 8/2007 | Monaco et al. |
| 2008/0066979 A1* | 3/2008 | Carter .......................... 180/65.5 |

FOREIGN PATENT DOCUMENTS

| | | |
|---|---|---|
| EP | 0 654 477 A2 | 7/1994 |
| JP | 2-309494 | 12/1990 |

OTHER PUBLICATIONS

Internet Store Software, goemerchant.com website: http://www.goemerchant.com/internet store.htm?vcn=google&vcad=Store Stores Online BuildStartOpen&gclid=ClimuuiKio4CFQPrYgod0F_XEA, 3 pages printed from the Internet on Aug. 22, 2007.

*Internet Documents* Back to the Future, MIT website: http://ctl.mit.edu/index/pl?id=3732, 3 pages printed from the Internet on Nov. 17, 2006.

\* cited by examiner

SOCIAL NETWORKING INTERACTIVE SHOPPING SYSTEM

BACKGROUND OF THE INVENTION

1. Field of the Invention

The present invention relates to social networking interactive shopping systems. More particularly, the present invention relates to a social networking interactive shopping system having consumer loyalty features, consumer behavior modeling and prediction features, and a portable consumer user interface for consumer access to the system.

2. Description of the Related Art

Shopping carts of the past have merely been mechanical, passive devices, capable of assisting transport of goods from the store aisles to the checkout station. Even where a LCD display and supporting video hardware have been added in order to display advertisements to the shopper, the traditional shopping cart is still a passive device. Indeed, the merchant runs the risk of alienating his customers by merely adding display hardware to his shopping carts and bombarding the shoppers with unsolicited advertisements without providing any benefit or reward to the shoppers. It would be desirable to make the shopping cart interactive. Moreover, it would be desirable to eliminate the requirement to queue up into a check out line when purchasing store items.

Thus, a social networking interactive shopping system solving the aforementioned problems is desired.

SUMMARY OF THE INVENTION

The social networking interactive shopping system includes mechanical and computerized devices that assist a user in managing their social and shopping needs while visiting at a merchant store. The shopping cart enables a shopper to perform self-checkout operations at the store. The shopping cart includes a bar-code scanner, RFID receiver, and web-enabled computer with display. The computer displays product-specific information. One or more scanner/readers attached at various locations on the shopping cart scan the product for identity and price. The computer retrieves product-specific information and displays this information on its display.

Upon successful scanning of a product and display of the product information, the shopper can accept or reject the product. On completing shopping, the shopper selects a preferred payment method on the device and pays using the selected method. A server having market survey, advertising, promotions security, payment, and social networking and personal management services application software is provided for wireless communication with the shopping cart computer throughout the shopping session. Moreover, the user is able to manage all of his/her purchases, product and service interests, across merchants and shopping experiences. Additionally the user can manage and share these experiences with others in his/her social network.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
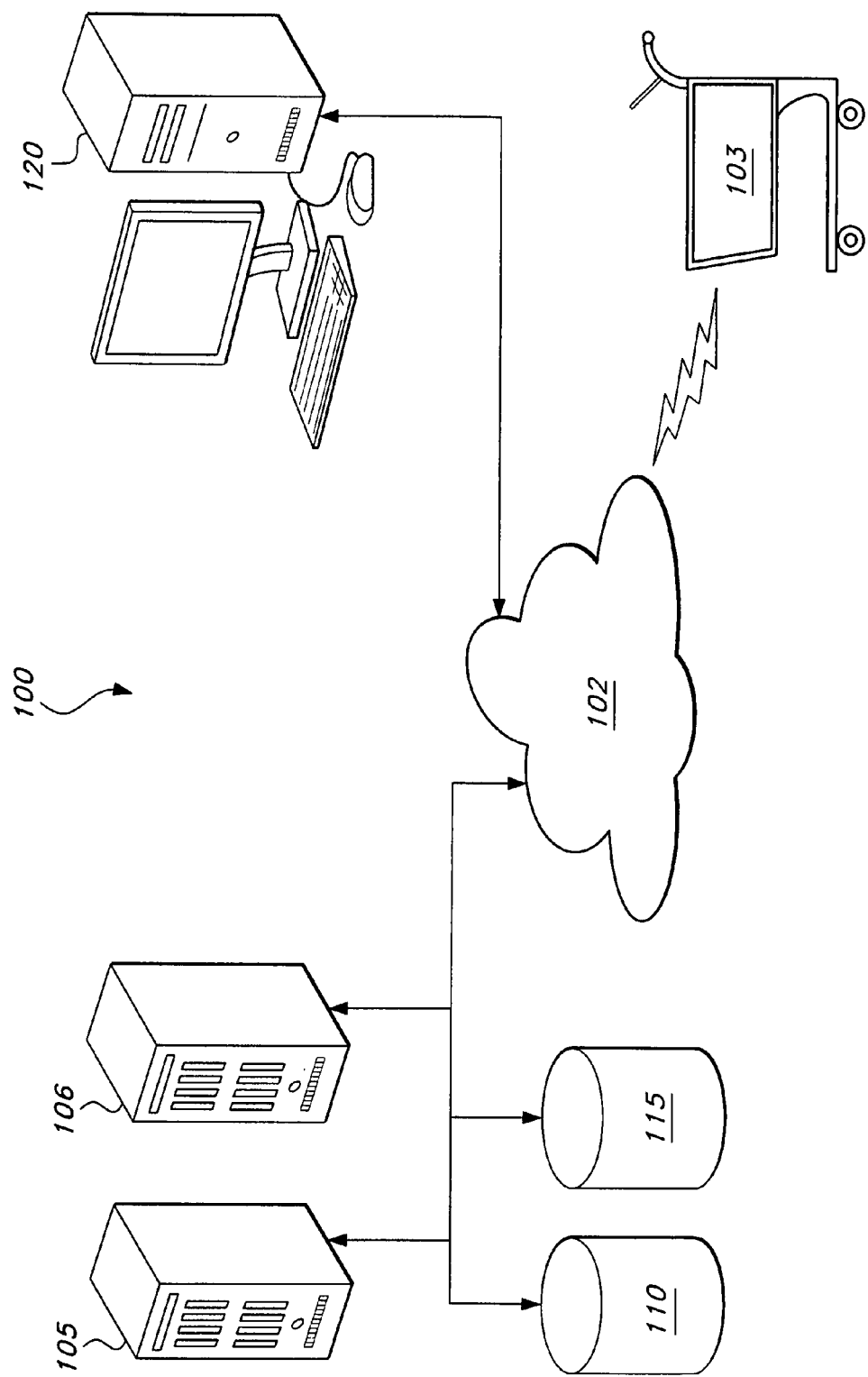
FIG. 1 is a block diagram of a social networking interactive shopping system according to the present invention.
Figure 2:
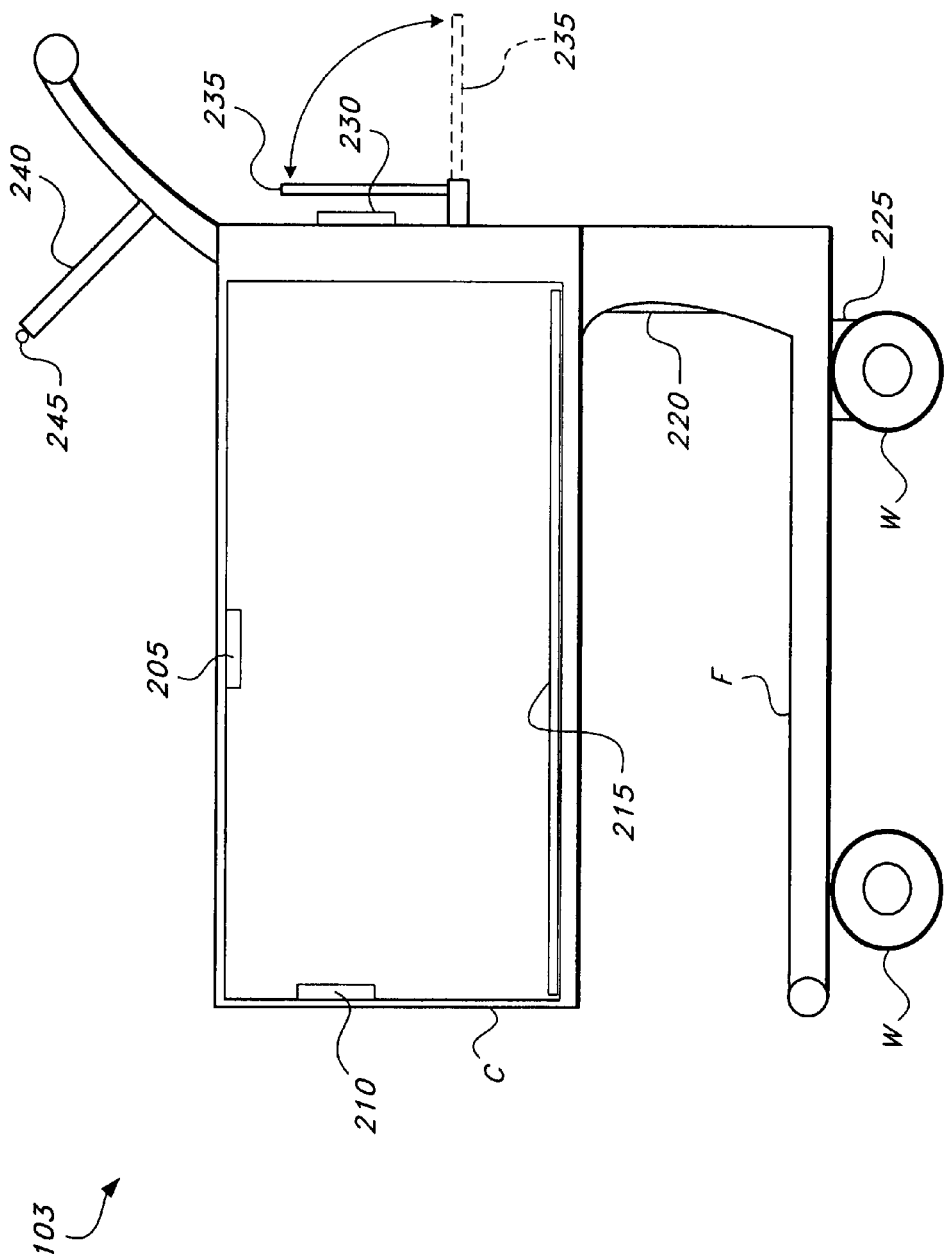
FIG. 2 is a diagrammatic view of a shopping cart in a social networking interactive shopping system according to the present invention.
Figure 3:
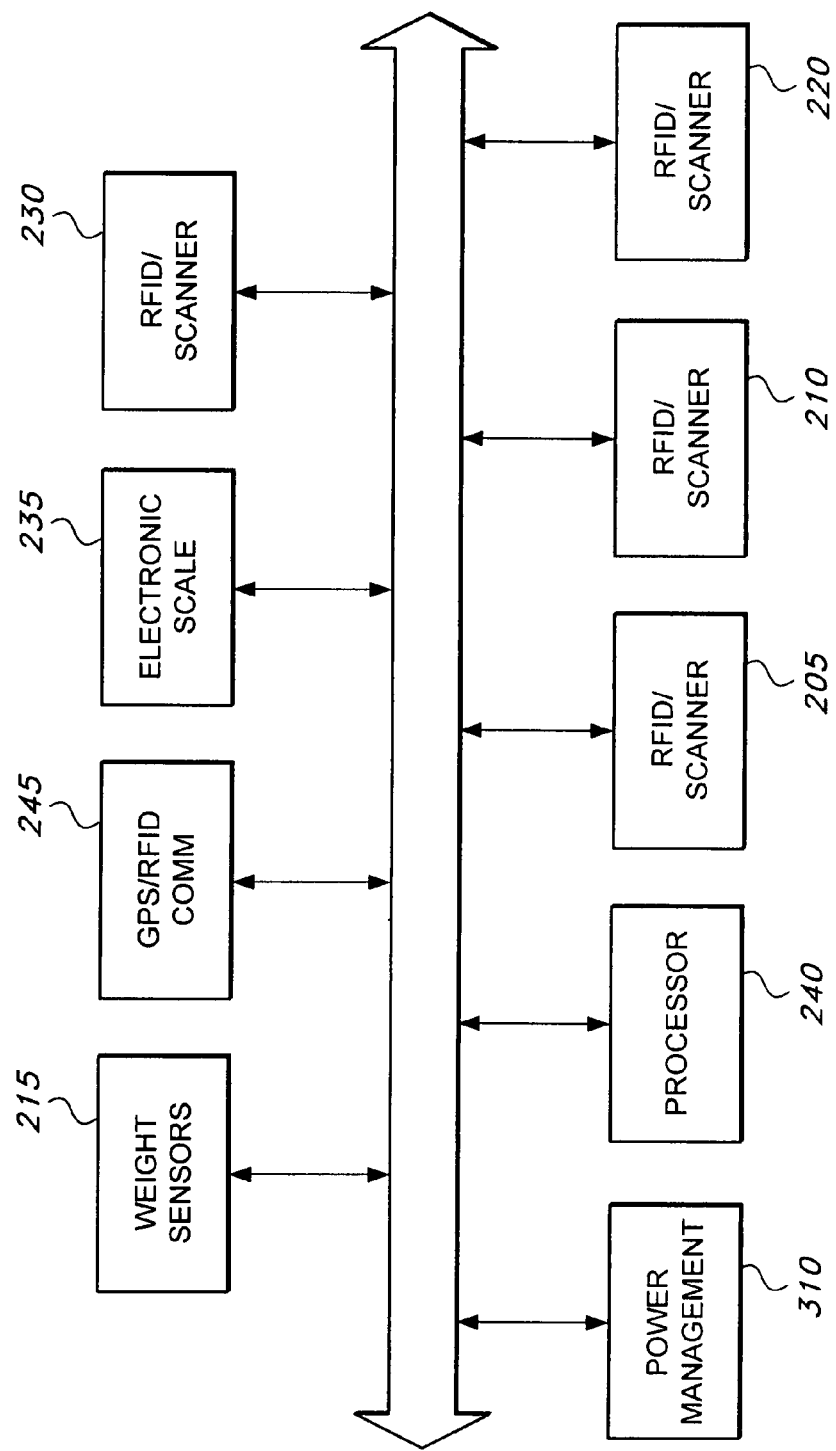
FIG. 3 is a block diagram of electronic devices disposed on a shopping cart in the social networking interactive shopping system according to the present invention.

The present invention, system 100, includes mechanical devices, computerized devices, and server-client systems that assist a user when shopping at a merchant store. A shopping cart 103 enables a shopper to perform self-checkout operations at the store. The shopping cart 103 includes at least one bar-code scanner, RFID receiver, and web-enabled computer 240 with display. The computer 240 displays product-specific information. One or more scanner/readers, e.g., RFID/scanners 205, 210, 220, 230 attached to the shopping cart 103 can scan the product for identity and price. The computer, portable wireless user interface device 240 retrieves product-specific information and displays this information on its display. GPS/RFID wireless communication module 245 may be attached to the wireless user interface, i.e., computer 240, or may be separately attached to the shopping cart 103. The GPS/RFID communications module 245 is capable of operable communication with servers 105 and 106. The shopping cart 103 may have a plurality of weight sensors 215 disposed inside the cage C of the cart 103. The shopping cart 103 may also have a pivotally mounted electronic scale 235 for convenient weighing of produce, or the like before a user places the items in the cart cage C.

Figure 7:
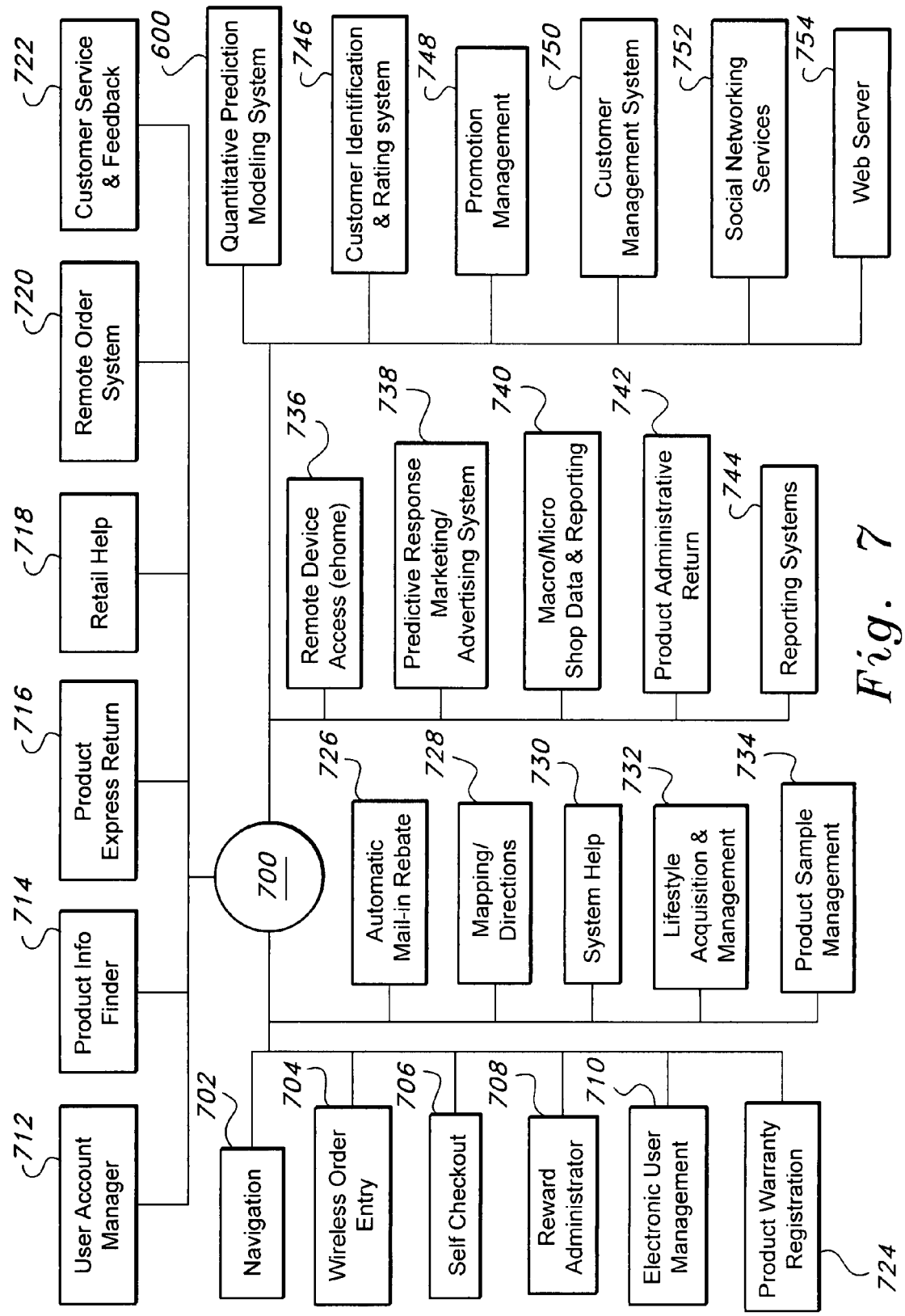
FIG. 7 is a block diagram of major software components in a social networking interactive shopping system according to the present invention.

Upon successful scanning of a product and display of the product information, the shopper can accept or reject the product. On completing shopping, the shopper selects a preferred payment method on the device 103 and pays using the selected method. At least one of servers 105 and 106 having market survey, advertising, promotions, security, social networking and personal management services, web server capability, a quantitative prediction modeling system that predicts behavior of the user, a predictive response marketing/advertising system that targets advertising messages to the user based on a predicted customer response to the advertising messages, and payment application software is provided for wireless communication with the shopping cart computer 240 and other devices/systems within and without the inventive system 100 throughout the users' sessions. Mass storage unit 110 may be used to store the applications and data related to the applications. Processes running on a server of the system 100 may be managed and co-coordinated by an executive processing component 700. While, as shown in FIG. 7, the executive processing component 700 is a centralized core process, it is contemplated by the present invention that executive processing component 700 may be distributed, may be non-centralized, and may execute over a plurality of processing threads either synchronously or asynchronously, sequentially or in parallel, hierarchically or non-hierarchically.

Social networking and personal management and connectivity services application software 752 may be included on a dedicated server 106 to provide a plurality of services, including a social networking and personal management website. Social networking and personal management and connectivity server 106 preferably communicates with user systems, personal computer 120 and shopping cart 103, via LAN or WAN, such as Internet connection 102. Server 106 may be onsite or offsite and may run social networking software, and predictive behavior modeling software in tandem with other operations of system 100 via the Internet 102. The server 106 can maintain a social networking database along with required social networking computer programs/applications within social networking mass storage unit 115. The social networking services contemplated herein may allow users of the system 100 to create a personal profile for themselves.

The system 100 may provide means for a user to create and maintain a personal web page, upload a user profile, pictures of himself/herself, diet information, recipes, food preparation video clips, pictures, or the like. The system 100, via the social networking services software running in server 106, may also provide means for users to establish friendships with other users via a group affiliation interface, or the like. As known by those of ordinary skill in the art, the social networking services running on server 106 within system 100 may provide confirmation means enabling users to confirm their friendship before establishing the friendship as a network link in the system 100. As known by those of ordinary skill in the art, application software running on the social networking server 106 may establish privacy controls that allow the user to choose who can view their profile or contact them, etc. A Virtual voice mail and Internet call telephone interface may also be provided.

Social networking services 752 may be in operable communication with a web server function 754 to provide a user customizable display page on the wireless user interface device, i.e., computer 240. Additionally, the page displayed via web server 754 may provide a user interface for a user account manager 712. The user account manager allows the user to create, customize, and manage their account, features, lists, preferences, history, alerts, as well as access value added content and activities. Moreover, via the user account manager 712 shopping lists can be accessed and displayed on the wireless mobile interface 240 (either the version of computer 240 attached to cart 103 or the standalone version), internet, kiosk, or mobile phone.

The shopping lists also may integrate with personal budgeting functionality and shopper navigation. Additionally, a data bank including sizes, color preferences, and other information can be associated with family and friends, and can be maintained via the wireless user interface 240. The user account manager 712 also provides a means for the user to view historic data including purchases, returns, savings, shopping experiences, duration data, rewards, and the like. The user account manager 712 stores and accesses multiple charge and debit accounts through one card and allows the user to choose which, account that they wish to access. Also users can associate their debit or credit cards with their user account and they can deposit cash into their account through the interactive store kiosk. All options are available through their user account at checkout.

A product express return module 716 processes return merchandise and may be accessed through the wireless computer 240 or a user's other web-enabled computing device 120. The product express return module 716 allows a user to return products through the system. A return merchandise authorization (RMA) is created which can be printed for the customer to take back to the store along with the merchandise so that a clerk can scan the item and RMA and approve or deny the transaction. Once approved, the customer's financial account is credited via the erewards system and the customer's points account is debited accordingly.

The retail help function 718 provides live personal assistance (in-store), live chat, call back, email and a FAQ/knowledge bank.

A remote order system 720 allows a user to order from any location in the store "prepared to order items" for pickup when at a user specified time within a "when ready" window determined by the system 100. A wireless order entry feature 704 enables the user to interface with the remote order system 720 via wireless devices, such as the wireless user interface 240. A remote device access module 736 allows the user to shop from home or other remote access location.

Using self checkout module 706 of the system 100, via the wireless user interface 240 in combination with the shopping cart 103 or in a standalone version, the user can user can "self checkout" (product selection conversion) remotely and wirelessly through the shopping cart 103. Moreover the self checkout feature 706 can be accessed through a kiosk, the Internet, or through a portable wireless device such as a cell-phone, PDA, or the like. This happens through the System, electronically, where all of a customer's purchases are in the system and upon checkout, the customer clicks a checkout key and his/her account is charged appropriately as rewards and discounts are applied. Products and purchases are verified prior to leaving the store.

A mapping/directions module 728 is provided that can display on the user's web enabled device, such as computer 240 on cart 103, maps and directions to various retailers.

The system 100 has complete mobile and wireless in-store navigation systems 702. Via in-store navigation system 702, automated maps can be generated by product/store searches and/or generated based upon a user's shopping list. The retailers' store layout can be displayed and the map can be organized so that the user can easily and sequentially move to selected (and suggested) items to minimize shopping time while maximizing efficiency and interest. Utilizing product RFID and Area-GPS technology, the in-store navigation system 702 provides store mapping functions which can be accessed via the computer, i.e., wireless user interface 240, of shopping cart 103, via in-store kiosk, via wireless telephone, the internet, or the like.

Moreover, a plurality of software/hardware components of system 100, including electronic user management 710, reward administration component 708 and promotion management component 748 can manage electronic rewards points (eRewards) for system shoppers based upon purchases, loyalty, returns, incentives/bonuses, and family and/or group affiliations, and in accordance with information gathered from the social networking part of the system 100.

The eRewards, ecoupons, and the like, are managed by a complete integrated electronic user management system 710 that includes electronic coupon filing, reminders, real time access and redemption (during shopping) for online users as well as users having access to an enabled shopping cart, a mobile telephone (cell phone, PDA, smartphone, or the like).

The main idea of eRewards is that a shopper has one universally accepted rewards account for multiple retailers instead of five or ten different cards/accounts and various rewards coupons to keep track of. The eRewards are accepted across all retail product and service categories.

Rewards can be accessed directly by the consumer, tracked, banked, redeemed, donated, and/or gifted through the system 100. The user's account can be accessed at any user interface point on the system 100. The eRewards functionality of the system 100 includes promotional points and incentives customized for each shopper based upon his/her personal profile, behavior and spending habits, demographics, and lifestyle.

The processes and components of retail features described herein may run in server 105, server 106, or be distributed across a plurality of servers in a distributed processing environment. A Product and Information Finder 714 (Product Genie) can find, identify, and locate products, services, and retailers for users of system 100. Additionally, the finder 714 interfaces with store inventory data (through a system internet interface) and can display product attributes (color, size, etc.), availability, stock levels, precise product location within a particular retailer (through integration with the Mapping and Navigation Module 702), and provides the consumer with specific purchase options. Product specifications, product compliments, customer product ratings, compliment matches, and other information are also generated by the product and finder module 714 and made accessible to the user. This is accessible through a kiosk, social networking site, shopping cart, or web enabled mobile device.

The product and information finder 714 includes product order entry processes that allow the user to search and find items (including out of stock items) through the retailers' web store with various product pickup/delivery options at all user interface points through the system (including in-store). Moreover, a product sample management component 734 provides product sample processes, which include an interface for the system 100 to order free product samples from suppliers.

Figure 8:
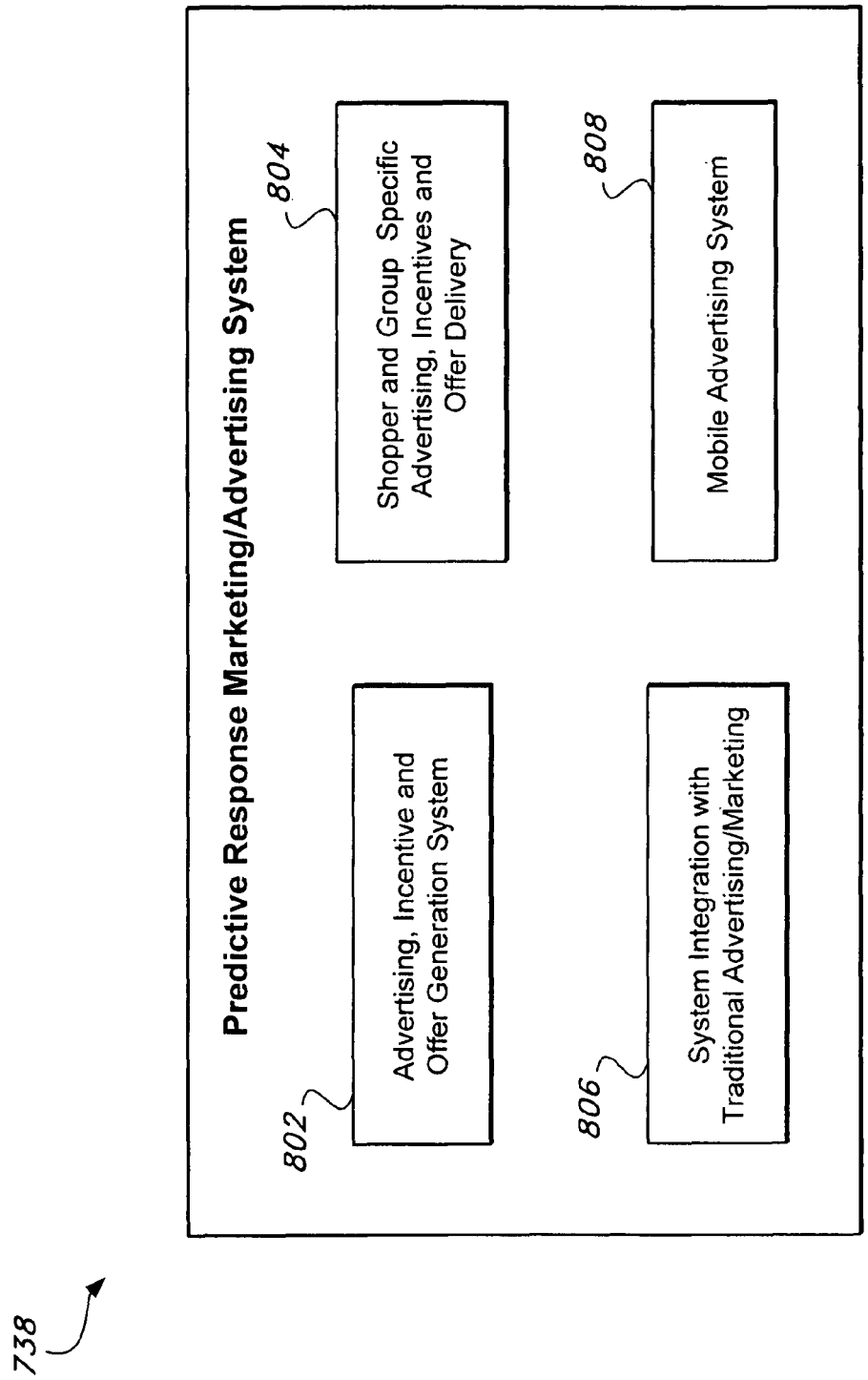
FIG. 8 is a block diagram illustrating software components of the predictive response marketing/advertising system of a social networking interactive shopping system according to the present invention.

As shown in FIG. 8, a predictive response marketing/advertising module 738 (PRMS) is provided to compare specific historical macro and micro personal lifestyle, consumption, and shopping criteria including demographics, behaviors, shopping event patterns, explicitly stated preferences, inferred preferences, category and product matching data references, seasonal, time and weather patterns, ownership data, familial relationships and patterns, demonstrated personal interests, perceptions, needs, offer responsiveness, product and brand penetration and longevity, and leverages these data sets to make dynamic predictions about a consumers (or group of consumers) immediate and future behavior for the ultimate purpose of prioritizing and generating real time advertising, incentives, offers, discounts and rewards that would, most immediately appeal to the target consumer(s). Modules within the PRMS 738 include an advertising, incentive and offer generation system 802, a shopper and group specific advertising, incentive and offer delivery system 804, and a system integration with traditional advertising/marketing module 806.

Additionally, the predictive response marketing/advertising module 738 has a mobile advertising system 808 that provides response data, mobile proximity personal identification, and a GPS direction/mapping feature. The response portion of mobile advertising system 808 provides capability of overall system 100 to simultaneously proximity broadcast Offers/Advertisements through the system 100. Additionally, the mobile advertising system 808 provides an interface for user access with a cell-phone or other mobile wireless device. Offers can be stored for later access through the Internet social networking site, mobile wireless device, kiosk, and/or shopping cart 103 of the system 100.

Figure 4:
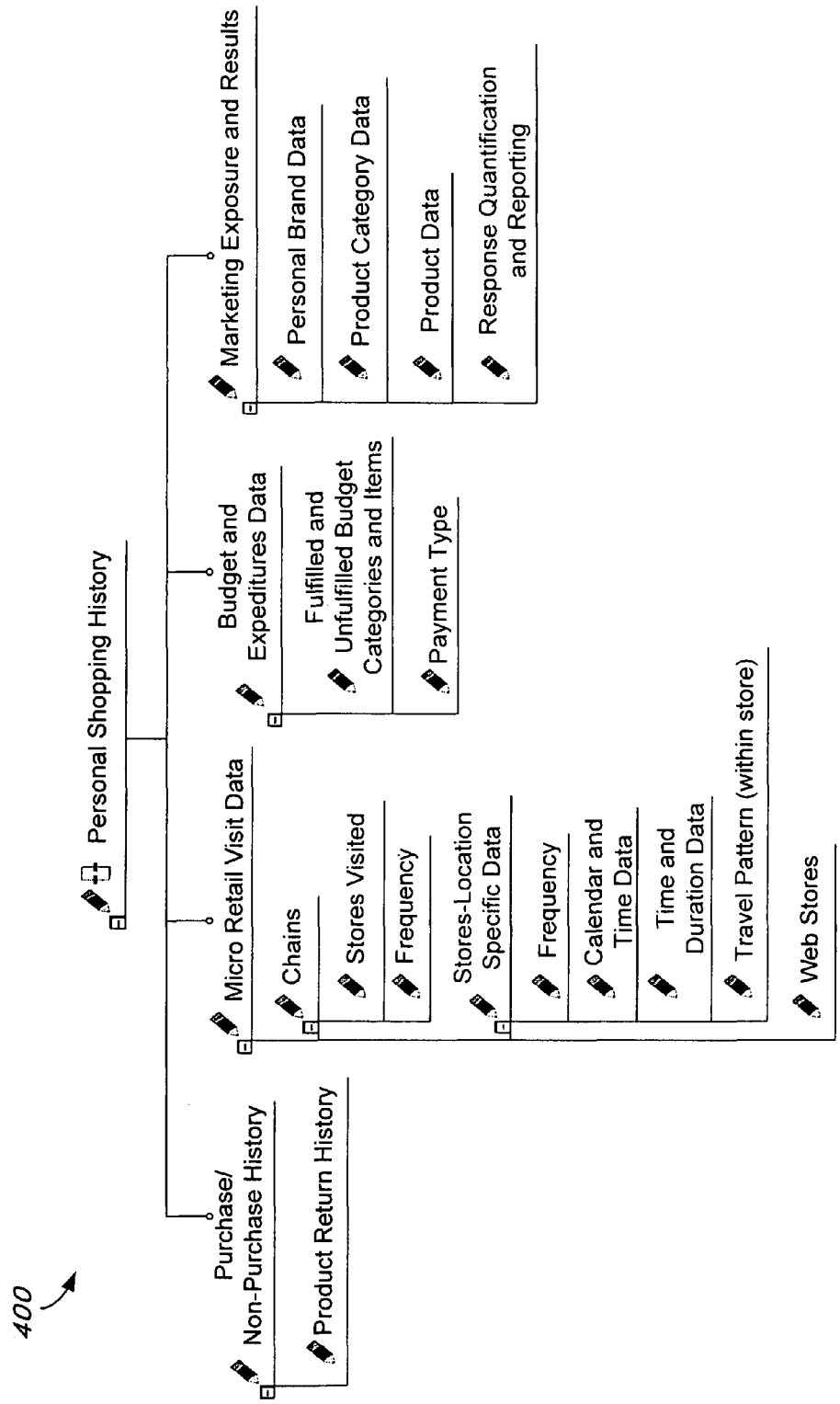
FIG. 4 is a chart of representative personal shopping history data maintained by the social networking interactive shopping system according to the present invention.
Figure 5:
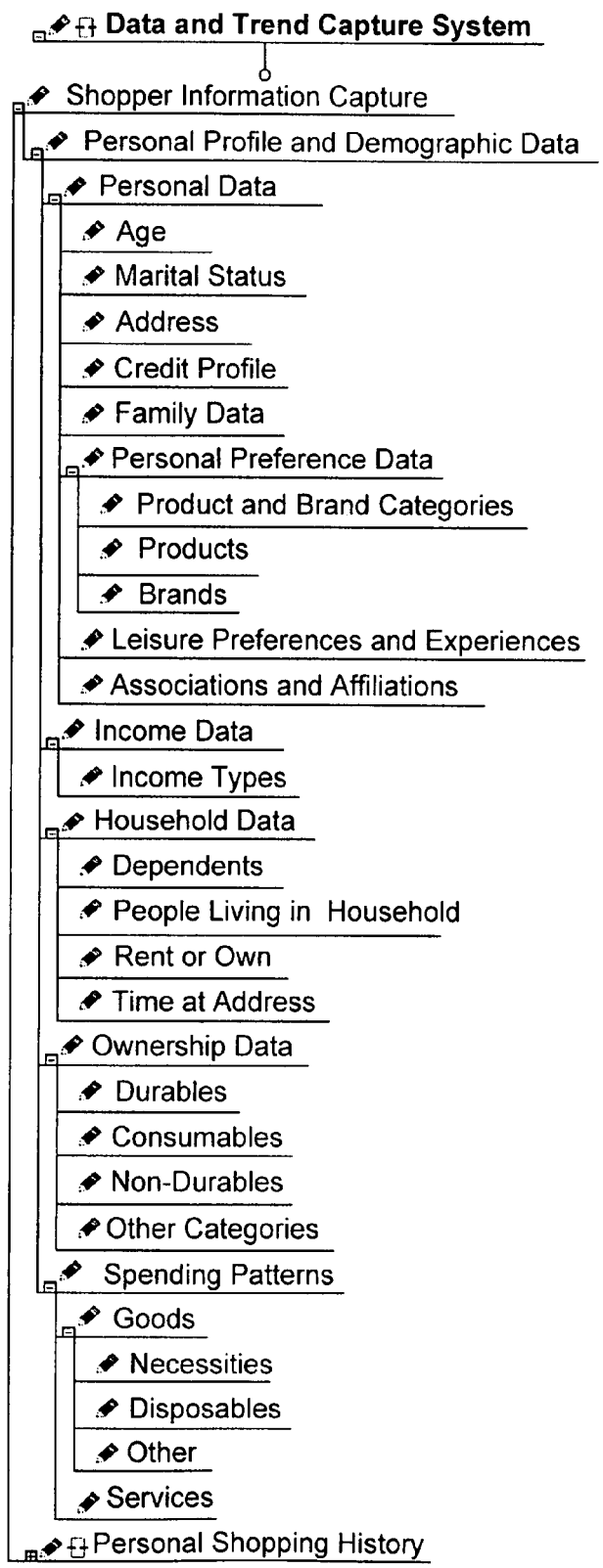
FIG. 5 is a chart of a representative data and trend capture system in a social networking interactive shopping system according to the present invention.
Figure 6:
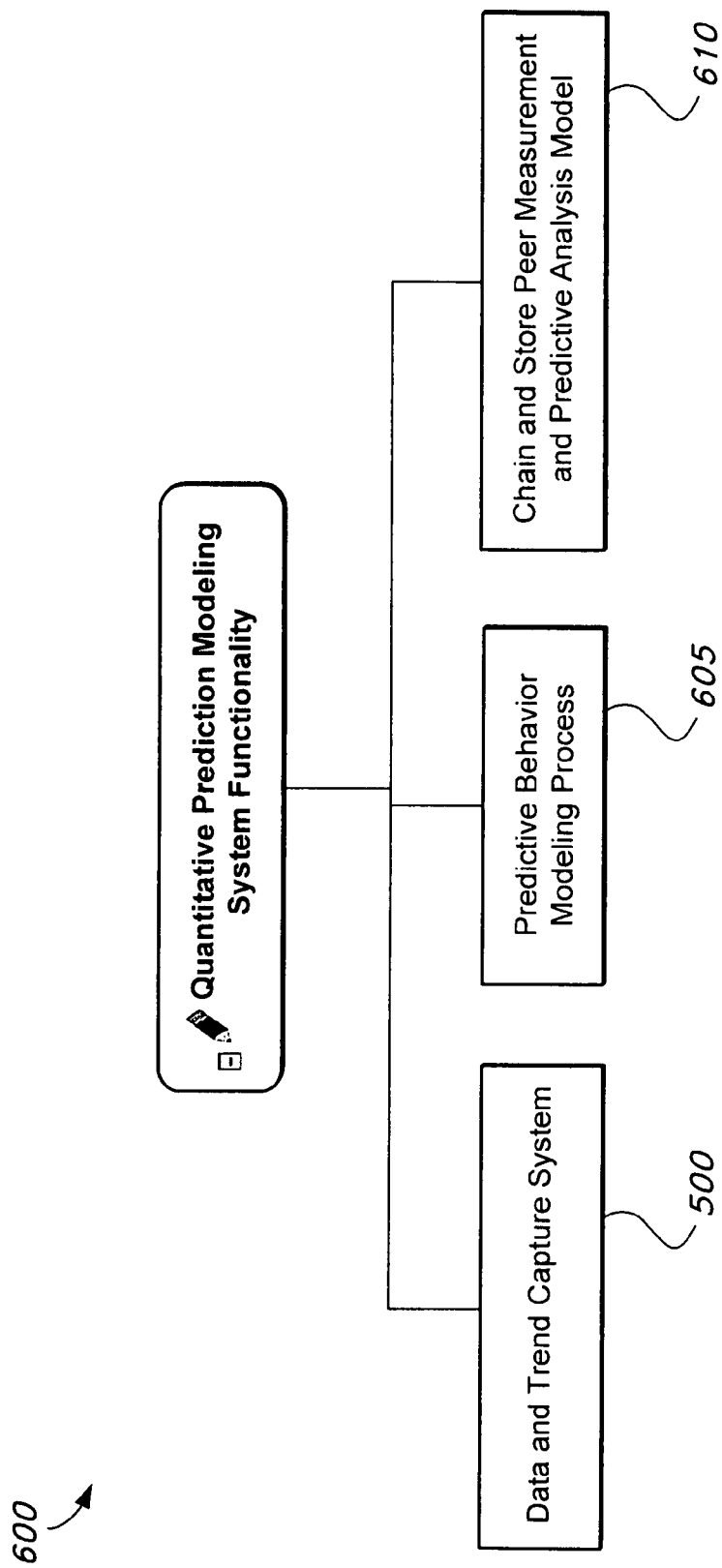
FIG. 6 is a block diagram of a quantitative prediction modeling system in a social networking interactive shopping system according to the present invention.

As shown in FIG. 6, a quantitative prediction modeling system 600 (QPMS) is provided to record, measure, quantify, model, and generate assumptions and predictions about a shopper's, consumer's or retailer's future behavior using non-parametric statistical models to calculate conditional probabilities of behavior. Within the quantitative prediction modeling system 600, a data and trend capture system 500 can capture a variety of data. Included capture data may be comprised of personal and shopper information. As shown in FIG. 5, a User Information capture feature is provided within the data and trend capture system 500 and can capture detailed personal, income, household, ownership, and demographic data. For example, as shown in FIG. 4, personal shopping history 400 comprises a collection of data and metrics representing a user's social and shopping history and patterns of behavior. The data shown in FIG. 5 is used throughout the system 100, and more particularly by the QPMS 600 and the PRMS 738 to generate a quantitative model of a specific user's (or group of users) behaviors to generate predictions about future behavior(s). Predictive behavior modeling processes 605 and chain and store peer measurement and predictive analysis models 610 are sub-processes of the quantitative prediction modeling system 600.

Within the QPMS 600 the capture data can be used to develop micro and macro models of user behavior. Comprehensive consumer behavior and response data is also collected such as, shopping patterns, expenditure data, product and brand profiles, marketing response and reaction data. The information is collected through multiple data points including the social networking website, wireless shop portion of the system 100, kiosks, website of system 100, shopping cart 103 of system 100, the erewards Account set up by rewards administration feature 708, and the local LAN/Server 105.

A predictive modeling component within a predictive response marketing/advertising system 738 (PRMS) creates, tests, and generates predictive models of consumer behavior within the context of specific circumstances, environments, and experiences, based upon assumptive conditions. Preferably, the predictive modeling component of PRMS 738 generates models of behavior on the basis of input criteria and allows for the generation of "if/then" predictions of a specific user's (or specific group of users') behavior.

A Product Predictor within the Predictive Modeling Process utilizes data within system 100 to quantify and compare historical and real time data to generate behavior predictions of user (or group of users) as they relate to particular product categories, products, substitutes, and compliments based upon the relative importance of a particular product category and/or product within the consumption sphere of a particular user or group of users.

A Product Priority Quantifier within the QPMS 600 creates a product significance hierarchy for the particular consumer (or group of consumers). It measures and quantifies how important a specific product and product category are to a particular consumer target(s). The criteria are based on personal and lifestyle needs analysis, income factors, frequency of product experiences, frequency of compliment product experiences, Income match/product relationships, demographic data, lifestyle categories, and comparative consumer/user dynamics. A lifestyle acquisition and management feature 732 may provide content to a personal social networking site accessible by the user's web enabled device, the content being tailored to the user's lifestyle and may include birthday and special calendars unique to a particular user, gift and wedding registry (a registry across various retailers for weddings and special occasions), instant messaging, budgets and financial planning, alerts, alarms, friend proximity finder (finds preset friends logged on and in close proximity to the user). News, entertainment, sports, polls and a horoscope may be custom tailored to the individual user of the system 100. Lifestyle acquisition and management feature 732 also allows the user to access sites of other individuals, groups, and users within the social networking website.

A Product Matching Pattern Quantifier within the QPMS 600 measures relationships between products, product substitutes, and product compliment purchase patterns and, using algorithms, statistically generates predictions about future consumer behavior based upon these matching relationships. It generates a product matching pattern hierarchy for a specific consumer or group of consumers. The criteria are based on frequency of product experiences, frequency of substitute product experiences, product relationships, price/product/quantity equilibriums, demographic data, lifestyle categories, and comparative consumer dynamics.

A Product Substitute Mobility Quantifier within the QPMS 600 measures and quantifies comparative Product Substitute Mobility by testing and measuring response results of a consumer or group of consumers to changes in behavior in relation to a particular product in the context of other substitute products through a progression of offers, incentives, discounts and rewards.

The Product Substitute Mobility Quantifier may measure and quantify Product Substitute Mobility by dynamically testing and measuring response result data for a consumer or group of consumers through a linear progression of offers, incentives, discounts and rewards.

The Product Substitute Quantifier, preferably within the QPMS 600, creates a product substitute hierarchy for a particular consumer or group of consumers. It measures and quantifies relative product mobility of a specific consumer target(s) to substitute products and product categories and, from that analysis, statistically generates predictions about future behavior of the consumer. The criteria are based on frequency of product experiences, frequency of substitute product experiences, comparative product relationships, statistically generated price/product/substitute equilibriums, demographic data, lifestyle categories, and comparative consumer dynamics.

A Compliment Quantifier, preferably within the QPMS 600, generates a quantifier for particular products and product categories based on demonstrated and inferred compliment product preferences and experiences for a specific consumer or group of consumers. The criteria are based upon product and product category compliment experiences and personal responses within the context of various offers, incentives advertising, and marketing.

A Brand Predictor, preferably within the QPMS 600 based upon historical and modeled system data, quantifies and compares historical and real time data to statistically generate predictions of consumer or group of consumers as they relate to particular brands and brand categories, brand substitutes, and brand compliments. These are based upon the relative importance of a particular brand within the consumption sphere of a specific consumer or group of consumers that is statistically generated and tested from experience data.

A Brand Priority Quantifier, preferably within the QPMS 600, creates a brand significance hierarchy (penetration) for a particular consumer or group of consumers. It measures and quantifies how important a specific brand or group of brands is to a specific consumer target(s). The criteria are based on preference analysis, demonstrated and inferred personal/group needs analysis, frequency and amplitude of brand experiences, income match/brand relationship statistics, demographic data, lifestyle categories, and comparative consumer dynamics.

A Brand Preferences Experience Rating generates a quantitative brand related rating based on past brand experiences, and uses this data to weight, rank, and score specific brands in order of importance relative to a specific consumer or group of consumers.

A Brand Substitute Quantifier, preferably within the QPMS 600 generates a brand substitute hierarchy for a specific consumer or group of consumers. It measures and quantifies how mobile specific consumer target(s) may be between substitute brands and brand categories and, from that analysis, generates predictions about future behavior. The criteria are based on frequency of product experiences, frequency of substitute brand experiences, brand relationships, price/brand equilibriums, brand perceptions, demographic data, lifestyle categories, and comparative consumer dynamics.

A Brand Substitute Mobility Prediction model, preferably within the QPMS 600, measures and quantifies Brand Substitute Mobility by testing and recording response results of a consumer or group of consumers through progressive offers, incentives, discounts and rewards.

Brand Equilibrium Modeling, preferably within the QPMS 600, generates models of consumer behavior as it relates to brand/substitute/pricing relationships. Historical and real-time response data capture is leveraged to generate predictions about brand related (contextual) behavior of a particular consumer or group of consumers.

A Brand Compliment Quantifier, preferably within the QPMS 600, creates a brand compliment hierarchy for a particular consumer or group of consumers. It measures and quantifies the relative probability of responsiveness that specific consumer target(s) may have to compliment brands and brand categories. The criteria are based on frequency and amplitude of brand experiences, frequency of complementary brand experiences (in similar context), complement brand perceptions and relationships (stated and inferred), price/brand/complement equilibriums, demographic data, lifestyle categories, and comparative consumer behaviors.

A Comparative Consumer Analysis Brand Quantifier, preferably within the QPMS 600 generates quantifiers for specific brands and based on demonstrated behavior of similar (match) target consumer(s) and generates real-time predictions about future behavior of the target consumer(s).

Cross Brand Modeling, preferably within the QPMS 600, generates models and dynamic predictions of consumer behavior as it relates to complementary brand relationships. A Retailer Predictor, preferably within the QPMS 600, models and predicts a retailer's "most likely customer" based upon shopper data.

An Income Quantifier Match Scale, preferably within the QPMS 600, generates a quantifier for particular retailers, product category and specific products based on income determinants, expenditure experiences, and cycles.

The QPMS 600 may generate data driven demographic models, predictive models of behavior exhibited by individual consumers or consumer groups as they relate to micro and macro demographic data. The model generation feature of the QPMS 600 analyzes historical and real time shopping behavior patterns within the context of demographics to make assumptive predictions about future behavior.

A shopping pattern modeling feature of the QPMS 600 analyzes and predicts macro and micro shopping patterns of both individual consumers and consumer groups. It collects, stores, and manipulates and classifies historical and real time data sets regarding types of shops, frequency of shops, duration of shops, times of day, days of the week, weeks of month, relationships between preceding and succeeding shops (shopping experiences before and after), travel patterns within retail locations, stores and locations visited, specific categories products and brands purchased and not purchased during shopping events, seasonal and weather patterns as they relate to shops, method of payment data, gross purchases, whether a carriage is used, time spent in a particular area within the retail location, store personnel assistance requests, whether self-checkout was used or not, and other observable patterns to produce predictions about a particular consumer or consumer groups behavior.

The system 100 provides a needs analysis quantifier which utilizes the Product Priority Quantifier within the QPMS 600 to generate a needs quantifiers for specific consumers as they relate to products and product categories based on demonstrated and inferred needs, historical product and product category experiences, and lifestyle patterns in a hierarchical manner, as in, for example, Maslow's Hierarchy. That is to say, the system 100 is capable of generating a needs quantifier based on physiological needs (breathing, food, water, sex, sleep, homeostasis, excretion), then safety needs (security of body, of employment, of resources, of morality, of the family, of health, and of property), then needs associated with loving and belonging (friendship, family, sexual intimacy), then needs related to esteem (self-esteem, confidence, achievement, respect of others, respect by others), then needs related to self-actualization (morality, creativity, spontaneity, problem solving, lack of prejudice, acceptance of facts).

A Comparative Consumer Analysis Product Quantifier, preferably within the QPMS 600, generates a quantifier for particular products and product categories based on demonstrated behavior of similar target consumer(s) and generates real-time predictions about future behavior.

A season and weather matching quantifier component of system 100 matches, compares, analyzes, and generates predications relating to shoppers specific behavior patterns as they relate to seasons and weather.

The Chain and Store Peer Measurement and Predictive Analysis Model is a component of the system 100 that stores and measures historical macro and micro shopping data as it relates to retail locations and retail chains and compares it to similar patterns of their peers. It then leverages this data to makes predictions regarding future patterns, trends, and results. It also quantifies behavioral and preference data among consumers who do and do not shop those locations. It collects, stores, and manipulates historical and real time data sets regarding types of shops, frequency of shops, duration of shops, times of day, days of the week, weeks of month, relationships between preceding and succeeding shops (shopping experiences before and after), travel patterns within retail locations, stores and locations visited, specific categories products and brands purchased and not purchased during shopping events, seasonal and weather patterns as they relate to shops, method of payment data, gross purchases, whether or not a shopping a carriage is used, time spent in a particular area within the retail location, offers and coupons used, sale item responsiveness, store personnel assistance requests, whether or not self-checkout was used, checkout duration, and other observable and implicit patterns.

Shopping cart 103 is the mobile interface integrated into a next generation shopping cart. As shown in FIG. 1, the shopping cart 103 is an interactive two-way electronic shopping carriage and data collection entry point that is powered and connected to LAN/HOST/SERVER Internet network.

A Kiosk may be placed at retail shopping locations and can function as a complete (retail) system user interface, rewards account card printer, cash, coupon, and payment collection point. A portable wireless interface computer having sensor processing and a user interface may be provided for users to access the system 100 while shopping but not using a shopping cart 103.

The retailer component of the system 100 provides process functionality, including reporting, analysis, process management and feedback to Retailers. The retailer component includes a Macro/Micro Shop Data and Reporting process that collects collates and disseminates specific retail, shop, and customer point of purchase location and shopper experience/response data and results to retailers and suppliers.

A Macro/Micro Shop Data and reporting component 740 collects and disseminates data relative to location shopping patterns, shopper profiles, product and brand results as they relate to that location, changes in product, category, and brand location within the location, as well as shifts in product and brand proximity to retailers and suppliers. Exemplary data elements collected may include Quantity of Shoppers, Unique Shoppers, Shoppers that are visiting a specific retail location for the first time, Referral Method (a Collection of information relative to how the shopper was referred to that location), repeat shoppers, quantity of repeat shopper visits, frequency data (How frequently specific shoppers visit), calendar, Time and Duration Data (When Shoppers visit and how long they visit for), Shopper Profiles (Who is visiting specific retailers), Product and Brand Results Data (a collection of real time data relating to performance of products and brands as a function of the person visiting, the location and time of visit).

Additionally, comparative change data may be provided. Comparative change data comprises a collection and report of result data relating to merchandising changes in products, product position, brand, brand position, compliment, and complement position relative to each other. The change data collection feature also generates models, suggestions, and predictions relating to product and service merchandising based upon collected experience data. Additional data elements used by the system 100 include a Customer Response Survey, which provides a collection and disseminates customer survey response and reports results. Location Performance Data collects information relating to changes in shopper traffic and retail location visits. A Shopper Churn feature collects and analyzes data relating to retailer gross and net shopper loss and gain.

A Product Administrative Return feature 742 of the system 100 processes the administrative functions of the return process including: product/policy return matching, Return Merchandise Authorization, payment credits, return scheduling, and comprehensive reporting.

A Reporting Systems component 744 of system 100 reports comprehensive data relating to shop experiences including, sales/non-sales trends, Inventory Information, In-Store Traffic Data, customer loyalty and return data, incentive program and information, and store, brand and product peer measurement, performance and comparison data. The reporting systems component includes Trend Prediction which is capable of predicting future trends based upon QPMS 600 data and modeling; inventory reporting which matches inventory data with self checkout data for comparison; traffic reporting which provides comprehensive in-store traffic data; incentive program administration which manages all aspects of rewards program; and a peer measurement and comparison system feature that generates and compares metrics between similar retail locations.

Moreover, a Customer Identification and Rating System 746 (CIRS) which Identifies customers to store employees/ management in terms of personal data as well as gross expenditures, loyalty, returns, and frequency of shops is provided. The CIRS 746 also generates a customer quantifier rating by creating a customer hierarchy and in relation to its universe of customers.

Customer Feedback feature 722 of system 100 can perform Administrative processing management of customer feedback including customer surveys, complaint/compliments, and reporting at all levels. Additionally, the customer service and feedback module 722 includes a product warranty registration feature 724, an automatic mail in rebate feature 726. System help 730 may also be selected for display on the user's web-enabled device and can provide a variety of help options regarding use of the system 100.

Discount/Coupon Administration is preferably a part of rewards administration 708 and provides a complete process and systems management feature that handles discount, coupon, incentive offers, and rewards administration and reporting.

A promotion management feature 748 of system 100 provides comprehensive sale and promotion activity along with results management and reporting.

A customer management system 750 provides empirical management, measurement, and quantitative analysis, and hierarchy development relating to retailers' customers and customer relationships.

Within the merchant store, i.e., point of purchase, a plurality of video advertising monitors may be disposed with in easy view of a shopper at a plurality of locations in the store. The advertising monitors may be connected to outputs of the QPMS and the PRMS so that the QPMS and the PRMS can target a specific consumer with a specific advertising message at his/her location as determined by the tracking and navigation system 702.

The shopping cart 103 may have an integral wheel mounted kinetic charger 225 for charging electronic systems aboard the shopping cart 103 when the cart is being propelled by the user. Additionally, the shopping cart 103 may have a solar charger to keep the electronic systems on the cart charged by indoor or outdoor incident solar light. All charging methods may be managed and coordinated by a power management system 310. Additionally, at least one of a wheel W, a frame F, a cage C, of the shopping cart 103 has electrical conduits capable of carrying charging current and being electrically connectable to an abutting, similarly equipped shopping cart in a charging station so that all such abutting shopping carts simultaneously receive a charging current from the charging station.

It is to be understood that the present invention is not limited to the embodiment described above, but encompasses any and all embodiments within the scope of the following claims.

I claim:

1. A real time social networking interactive shopping system adapted for use while the customer is physically located in a store, comprising:
   a portable wireless user interface, the portable wireless user interface being configured for use by a store customer when shopping;
   at least one merchant server configured to conduct a market survey in real time of the actual purchases while shopping, the merchant server further configured to store:
   real time advertising promotions, security, social networking services;
   a web server application;
   a quantitative prediction modeling system that predicts real time behavior of the customer based upon historical and real time data and purchases;
   a predictive response marketing/advertising system that targets real time advertising messages to the customer based on a predicted customer response to the real time advertising messages, wherein the predictive response includes a real time proximity broadcasting based on actual purchases and location of the customer in the store; and
   payment application software,
   the merchant server being in operable communication with the portable wireless user interface, wherein the portable wireless user interface displays a display page having content from which the customer selects and purchases the store items, the display page being established by the web server, the web server being in operable communication with the social networking services to determine the display page content that is customizable by the store customer; and
   at least one stored database having information associated with items for sale at the store, the at least one stored database being in operable communication with the at least one merchant server, wherein using the portable wireless user interface, the store customer purchases user selected store items thereby obviating the necessity for travel through a store check-out line.

2. The social networking interactive shopping system according to claim 1, further comprising a location tracking system for determining the approximate location of the portable wireless user interface.

3. The social networking interactive shopping system according to claim 2, further comprising a plurality of advertising monitors disposed with in easy view of the customer at a plurality of locations in the store, the video monitors being connected to outputs of the quantitative prediction modeling system (QPMS) and the predictive response marketing/advertising system (PRMS), wherein the QPMS and the PRMS can target a specific consumer with a specific advertising message to be displayed on a specific one of the advertising monitors at a customer location as determined by the location tracking system.

4. The social networking interactive shopping system according to claim 1, further comprising:
   a shopping cart, the portable wireless user interface being disposed thereon;
   a plurality of weight sensors disposed on the shopping cart to determine weight of items placed in the cart; and
   means for identifying an item and price of the item placed in the cart.

5. The social networking interactive shopping system according to claim 4, further comprising an electronic scale pivotally attached to the shopping cart.

6. The social networking interactive shopping system according to claim 4, wherein at least one of a wheel, a frame, a cage, of the shopping cart has electrical conduits capable of carrying charging current and being electrically connectable to an abutting, similarly equipped shopping cart in a charging station so that all such abutting shopping carts simultaneously receive a charging current from the charging station.

7. The social networking interactive shopping system according to claim 4, further comprising an integral wheel mounted kinetic charger disposed on the shopping cart for charging electronic systems aboard the shopping cart when the cart is being propelled by the user.

8. A real time social networking interactive shopping method adapted for use while the customer is physically located in a store and performed by a machine executing a program of instructions tangibly embodied in a program storage device readable by the machine, the method comprising the steps of:

conducting, by a machine executing a program, real time market surveys associated with a store customer's usage of the social networking interactive shopping method;

targeting, by a machine executing a program, store customers with real time advertising promotions based on the market surveys;

providing social networking and personal management services accessible to the store customers/users;

providing a web server application capable of providing at least one real time web page to the customers/users;

generating, by a machine executing a program, a prediction based upon historical and real time data and purchases;

generating, by a machine executing a program, a prediction of a store user's/customer's real time response to a proposed group of advertising messages, then based on the predicted customer response, selecting a specific real time advertising message for display to the customer/user;

storing at least one database having information associated with items for sale at the store at the program storage device;

determining an approximate location of the store customer when using the portable wireless communication device;

targeting the customer with a specific advertising message, the specific advertising message being determined by a result of the behavior and response predicting steps, display location of the message being determined by the approximate location of the store customer;

providing a portable wireless communication device that accesses the store items in the database, wherein the store customer purchases an item in the store using the portable wireless communication device, wherein the portable wireless communication device includes a display page having content from which the customer can select and purchase the store items, the display page being provided by the web server, the web server being in operable communication with the social networking services to determine the display page content that is customizable by the store customer;

via the portable wireless communication device, accepting payment from the customer for the store items; and where using the social networking interactive shopping method a customer purchases customer selected store items thereby obviating the necessity for customer travel through a store check-out line.

9. The social networking interactive shopping method according to claim 8, further comprising the step of determining at least a portion of display page content based on interoperability between the web server application and the social networking services.

* * * * *